Dec. 2, 1958    C. E. ANDERSON ET AL    2,862,288
NON-CONSUMABLE INERT GAS WELDING ELECTRODES
Filed Feb. 15, 1955
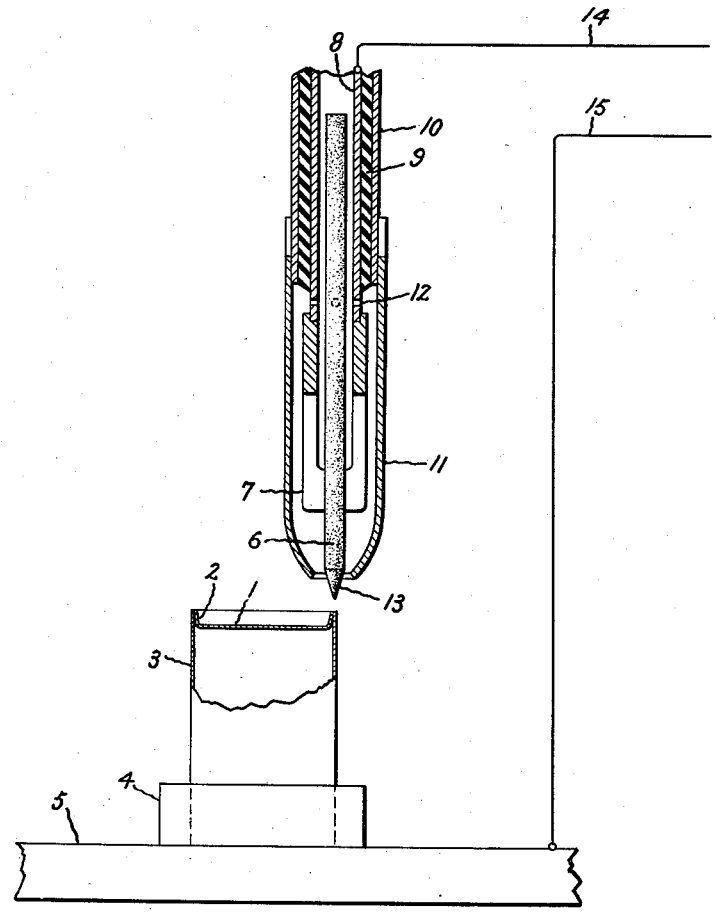
Inventors:
Carl E. Anderson,
Swegn D. Hamren,
by Paul A. Frank
Their Attorney.

United States Patent Office

2,862,288
Patented Dec. 2, 1958

2,862,288

NON-CONSUMABLE INERT GAS WELDING ELECTRODES

Carl E. Anderson, Oakland, Calif., and Swegn D. Hamren, Ballston Lake, N. Y., assignors to General Electric Company, a corporation of New York Application February 15, 1955, Serial No. 488,305

1 Claim. (Cl. 29—182.5)

The present invention relates to inert gas welding electrodes of the non-consumable type and more specifically to improved electrode compositions, particularly with respect to performance of the electrode at low welding currents.

Tungsten electrodes have been widely used in inert gas (argon or helium) welding apparatus with satisfactory results. In some applications, however, difficulty has been encountered in establishing and maintaining a stable arc at the welding currents required. For example, in the manufacture of electron discharge devices, it is often desirable to weld together thin stock of one of the refractory metals, such as tantalum, tungsten or molybdenum. In such an application, welding currents in the order of 1 or 2 amperes are desirable. With electrodes composed entirely of tungsten, however, difficulty is experienced with erratic operation at welding currents of 10 amperes or less. Tungsten electrodes having thoria as an additional ingredient have been employed for such applications and while the stability of the arc and the arc starting characteristics of the thoria electrodes are satisfactory, they are radioactive and consequently require special precautions during use in order to avoid serious health hazards.

In accordance with our invention, we provide an improved electrode which is characterized by good starting characteristics, the ability to hold a stable arc at currents in the order of 1 or 2 amperes, the ability to withstand high temperatures and the absence of any requirement for special precautions during use.

More specifically, we have provided an improved non-consumable welding electrode by including as an essential ingredient thereof zirconium carbide or zirconium diboride. The percentage of the zirconium carbide or diboride may be anything above a minimum of about 2 percent with the remainder tungsten. At 2 percent the effect of the zirconium carbide or boride in attaining the characteristics discussed above is significant. However, a percentage in the order of 10 to 20 percent is preferred and since the zirconium compounds are cheaper, at the present time, than tungsten, it is an economic advantage to use a substantial percentage of the zirconium carbide or diboride.

As a specific example of an electrode embodying our invention, a mixture of 10 percent zirconium carbide, 5 percent tantalum hydride and 85 percent tungsten in powdered form have been mixed together with a suitable binder, such as "Carbowax," and extruded into a rod of suitable dimensions, for example, $\frac{1}{16}$ inch in diameter and fired in a dry hydrogen or an inert gas atmosphere at a temperature of about 2200° C. The firing period may be short, e. g., 30 seconds or so.

The Carbowax or other binder volatilizes during the sintering operation so that it has no significant effect on the composition of the finished product. The zirconium carbide and tungsten are both very high melting point materials and some difficulty may be experienced in the sintering operation. The addition of tantalum hydride tends to facilitate the formation of the sintered rod and at the same time does not detrimentally affect the character of the finished electrode when used in limited percentages.

An electrode having the specific composition described above has been satisfactorily used for welding together pieces of molybdenum stock having a thickness of .005 inch with a welding current of 1 to 2 amperes.

Electrodes composed entirely of zirconium carbide have been used successfully for welding operations of the above type and while, as previously pointed out, the cost of this material is somewhat less than tungsten, the use of some tungsten with the zirconium carbide facilitates the manufacture of the electrode. Our invention also contemplates the use of zirconium diboride in place of zirconium carbide. Electrodes employing the diboride in place of the carbide, in general, exhibit the same desirable characteristics with respect to ease and stability of starting as those previously described.

In the single figure of the drawing, we have shown the improved electrode of this invention employed in convenient inert gas arc welding apparatus to fabricate thin sheet metal work pieces which may be of molybdenum. The work pieces include a header 1 with a circular flange 2 which is welded to one end of a cylinder piece 3 shown partially broken away to illustrate the header 1. The latter work piece is supported in an annular jig 4 carried by a conducting work table 5.

The non-consumable electrode 6 having a composition in accordance with the previous description is held in a spring collet 7 which in turn is attached to copper tube 8. Electrode 6 may extend into the tube 8 which serves as a means for supplying inert gas, such as argon or helium, about the electrode and also as a conductor for carrying welding current to the electrode 6 through collet 7.

The tube 8 is surrounded by an electrically insulating sleeve 9 which in turn is surrounded by a protecting casing 10 of some durable material, such as iron or steel. Nozzle 11 is frictionally engaged with one end of the casing 10 and provides a chamber enclosing the end of the tube 8 and the collet 7. Gas supplied through the tube 8 flows into the above chamber through a plurality of openings 12 in the side walls of the tube 8 and is discharged from the nozzle 11 about the arcing tip 13 of the electrode 6.

One terminal of a source of arc welding current is supplied to the tube 8 by a conductor 14. The other terminal of the source is connected by a conductor 15 to the work supporting table 5.

As is well understood, the arc may be established by means of a high frequency spark and, with electrodes having compositions in accordance with the present invention, is readily maintained even though the welding current may be as low as 1 or 2 amperes. Stable arc starting has been accomplished when using electrodes of the present invention with open circuit voltages in the order of 25 to 29 volts compared with an open circuit voltage in excess of 75 volts needed for a stable start with an ordinary tungsten electrode.

In the foregoing description of the compositions and in the claim, the percentages referred to are by weight.

What we claim as new and desire to secure by Letters Patent of the United States is:

A non-consumable inert gas arc welding electrode comprising an elongated sintered body consisting essentially of tungsten and a material selected from the group consisting of zirconium carbide and zirconium diboride, the latter material comprising from 10 to 20 percent of the mixture.

(References on following page)

References Cited in the file of this patent

UNITED STATES PATENTS

| | | |
|---|---|---|
| 1,992,372 | Holzberger | Feb. 26, 1935 |
| 2,021,576 | McKenna | Nov. 19, 1935 |
| 2,093,844 | McKenna | Sept. 21, 1937 |
| 2,497,090 | Miller | Feb. 14, 1950 |
| 2,640,135 | Cobine | May 26, 1953 |
| 2,697,734 | Zvanut | Dec. 21, 1954 |
| 2,726,153 | Ballhausen | Dec. 6, 1955 |

FOREIGN PATENTS

| | | |
|---|---|---|
| 424,961 | Italy | Sept. 5, 1947 |